US012752405B2

(12) United States Patent
Liu et al.

(10) Patent No.: US 12,752,405 B2
(45) Date of Patent: Oct. 6, 2026

(54) NUTRUNNER WITH CLUTCH MECHANISM

(71) Applicant: MILWAUKEE ELECTRIC TOOL CORPORATION, Brookfield, WI (US)

(72) Inventors: Taiting Liu, Guigang (CN); Nathan P. Sievers, West Allis, WI (US); Chaoqun Wang, Wuhan (CN); Wei Chao Xu, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/009,726

(22) Filed: Jan. 3, 2025

(65) Prior Publication Data

US 2025/0222573 A1 Jul. 10, 2025

(30) Foreign Application Priority Data

Jan. 5, 2024 (CN) ......................... 202420046862.7

(51) Int. Cl.

*B25B 23/147* (2006.01)
*B25B 23/14* (2006.01)
*B25F 5/00* (2006.01)
*B25F 5/02* (2006.01)

(52) U.S. Cl.

CPC .......... *B25B 23/147* (2013.01); *B25B 23/141* (2013.01); *B25F 5/001* (2013.01); *B25F 5/02* (2013.01)

(58) Field of Classification Search

CPC ..... B25B 23/141; B25B 23/147; B25F 5/001; B25F 5/02

See application file for complete search history.

(56) References Cited

U.S. PATENT DOCUMENTS

| | | | | |
|---|---|---|---|---|
| 2,176,928 | A | 10/1939 | Short | |
| 3,942,337 | A * | 3/1976 | Leonard | F16D 7/08 464/36 |
| 4,823,885 | A | 4/1989 | Okumura | |
| 4,836,349 | A | 6/1989 | Sakamoto et al. | |
| 5,458,206 | A | 10/1995 | Bourner et al. | |

(Continued)

FOREIGN PATENT DOCUMENTS

| | | | |
|---|---|---|---|
| CN | 1891410 | A | 1/2007 |
| CN | 201124405 | Y | 10/2008 |

(Continued)

*Primary Examiner* — Eyamindae C Jallow
(74) *Attorney, Agent, or Firm* — Michael Best & Friedrich LLP

(57) ABSTRACT

A nutrunner includes a housing, a motor with an output shaft rotatable about a first axis, a head including an output drive rotatable about a second axis, a transmission including a ring gear rotatable about the first axis, and a clutch mechanism. The clutch mechanism includes an adjustment collar rotatable about the first axis, rolling elements engaged with the ring gear, and a spring between the adjustment collar and the ring gear to bias the rolling elements into engagement with the ring gear. The clutch mechanism is configured to prevent the ring gear from rotating when a torque applied to the ring gear is less than a torque threshold, and to permit the ring gear to rotate when a torque applied to the ring gear is greater than or equal to the torque threshold. Rotation of the adjustment collar about the first axis adjusts the torque threshold.

17 Claims, 10 Drawing Sheets

(56) References Cited

U.S. PATENT DOCUMENTS

| | | | | |
|---|---|---|---|---|
| 5,505,676 | A | 4/1996 | Bookshar | |
| 5,551,927 | A | 9/1996 | Enzmann et al. | |
| 5,690,577 | A | 11/1997 | Enzmann et al. | |
| 5,704,433 | A | 1/1998 | Bourner et al. | |
| 6,142,243 | A | 11/2000 | Mayer | |
| 6,305,481 | B1 | 10/2001 | Yamazaki et al. | |
| RE37,905 | E | 11/2002 | Bourner et al. | |
| 6,676,557 | B2 | 1/2004 | Milbourne et al. | |
| 7,066,691 | B2 | 6/2006 | Doyle et al. | |
| 7,225,884 | B2 | 6/2007 | Aeberhard | |
| 7,360,607 | B2 | 4/2008 | Aeberhard | |
| 7,455,123 | B2 | 11/2008 | Aeberhard | |
| 7,469,753 | B2 | 12/2008 | Klemm et al. | |
| 7,537,540 | B2 | 5/2009 | Baumann et al. | |
| 7,556,103 | B2 * | 7/2009 | Matsunaga | B25B 23/147 702/182 |
| 7,644,783 | B2 | 1/2010 | Roberts et al. | |
| 7,658,239 | B2 | 2/2010 | Klemm et al. | |
| 7,665,392 | B2 | 2/2010 | Tokunaga et al. | |
| 7,712,546 | B2 | 5/2010 | Tokunaga | |
| 7,726,412 | B2 | 6/2010 | Matsunaga | |
| 7,806,200 | B2 | 10/2010 | Spielmann et al. | |
| 7,980,324 | B2 | 7/2011 | Bixler et al. | |
| 8,104,546 | B2 | 1/2012 | Aeberhard | |
| 8,205,685 | B2 | 6/2012 | Bixler et al. | |
| 8,316,959 | B2 | 11/2012 | Roehm | |
| 8,505,649 | B2 | 8/2013 | Scrimshaw et al. | |
| 9,027,666 | B2 | 5/2015 | Hecht et al. | |
| 9,494,200 | B2 | 11/2016 | Kelleher et al. | |
| 9,550,289 | B2 | 1/2017 | Parks | |
| 9,579,785 | B2 | 2/2017 | Bixler et al. | |
| 9,776,316 | B2 | 10/2017 | Hecht et al. | |
| 10,471,581 | B2 | 11/2019 | Parks | |
| 10,682,752 | B2 | 6/2020 | Hecht et al. | |
| 10,926,382 | B2 | 2/2021 | Hu | |
| 10,940,580 | B2 | 3/2021 | Brennenstuhl et al. | |
| 10,987,793 | B2 | 4/2021 | Bixler et al. | |
| 11,130,218 | B2 | 9/2021 | Hu | |
| 2007/0114049 | A1 * | 5/2007 | Steverding | F16P 3/20 173/15 |
| 2011/0000694 | A1 * | 1/2011 | Hansson | B25B 21/00 173/182 |
| 2012/0222879 | A1 | 9/2012 | Bixler et al. | |
| 2016/0039019 | A1 * | 2/2016 | Bublitz | B25F 5/02 30/277.4 |
| 2018/0214246 | A1 | 8/2018 | Ertugrul | |
| 2021/0205048 | A1 | 7/2021 | Ertugrul | |
| 2021/0268630 | A1 * | 9/2021 | Hegarty | B25B 21/004 |
| 2022/0040831 | A1 * | 2/2022 | Schneider | F16D 15/00 |
| 2023/0055198 | A1 * | 2/2023 | Yue | B25B 21/00 |

FOREIGN PATENT DOCUMENTS

| | | | | |
|---|---|---|---|---|
| CN | 101407053 | A | 4/2009 | |
| CN | 112548955 | A | 3/2021 | |
| CN | 114505812 | A | 5/2022 | |
| DE | 1478841 | A1 | 2/1969 | |
| DE | 9016415 | U1 | 7/1991 | |
| DE | 4038502 | A1 | 6/1992 | |
| EP | 0212381 | A1 | 3/1987 | |
| EP | 3361114 | A1 | 8/2018 | |
| WO | WO-2009005435 | A1 * | 1/2009 | B25B 23/14 |

* cited by examiner

NUTRUNNER WITH CLUTCH MECHANISM

CROSS-REFERENCE TO RELATED APPLICATIONS

The present application claims priority to Chinese Utility Model application No. 2024200468627, filed Jan. 5, 2024, the entire content of which is incorporated herein by reference.

FIELD

The present disclosure relates to power tools, and more particularly to powered nutrunner tools.

BACKGROUND

A nutrunner tool is a type of power tool and typically includes a housing, a motor with an output shaft arranged along a first axis, a head including an output drive that is rotatable about a second axis perpendicular to the first axis, and a transmission configured to transfer torque and rotation from the output shaft to the output drive.

SUMMARY

In some aspects, the techniques described herein relate to a nutrunner including: a housing; a motor disposed within the housing and including an output shaft rotatable about a first axis; a head extending from the housing, the head including an output drive that is rotatable about a second axis; a transmission configured to transfer rotation from the output shaft to the output drive, the transmission including a ring gear that is rotatable about the first axis with respect to the housing; and a clutch mechanism including: an adjustment collar that is disposed around the housing and rotatable about the first axis, a plurality of rolling elements engaged with the ring gear, and a spring positioned between the adjustment collar and the ring gear and configured to bias the plurality of rolling elements into engagement with the ring gear, wherein the clutch mechanism is configured to prevent the ring gear from rotating relative to the housing when a torque applied to the ring gear is less than a torque threshold, wherein the clutch mechanism is configured to permit the ring gear to rotate relative to the housing when a torque applied to the ring gear is greater than or equal to the torque threshold, and wherein rotation of the adjustment collar about the first axis adjusts the torque threshold.

In some aspects, the techniques described herein relate to a nutrunner, wherein the adjustment collar is configured to be rotated by hand without use of a tool.

In some aspects, the techniques described herein relate to a nutrunner, wherein the clutch mechanism further includes a plurality of pins disposed between the spring and the plurality of rolling elements.

In some aspects, the techniques described herein relate to a nutrunner, wherein the ring gear includes a groove formed in a front surface of the ring gear, the groove extending in a circumferential direction along a plurality of flat portions and a plurality of raised portions, and wherein the plurality of rolling elements is received by the groove.

In some aspects, the techniques described herein relate to a nutrunner, wherein the housing includes a flange portion having a plurality of apertures, and wherein the plurality of pins extends through the plurality of apertures in the flange portion.

In some aspects, the techniques described herein relate to a nutrunner, wherein the adjustment collar includes an outer collar and an inner collar, wherein the inner collar is rotationally fixed to the outer collar, and wherein the inner collar is moveable along the first axis with respect to the outer collar in response to rotation of the adjustment collar about the first axis.

In some aspects, the techniques described herein relate to a nutrunner, wherein the housing includes a plurality of detents, the outer collar includes at least one tab configured to engage the detents.

In some aspects, the techniques described herein relate to a nutrunner, wherein the housing includes an outer threaded portion, and the inner collar includes an inner threaded portion engaged with the outer threaded portion.

In some aspects, the techniques described herein relate to a nutrunner, further including a spindle extending along the first axis, wherein the transmission includes a first transmission portion configured to transfer rotation from the output shaft to the spindle, wherein the first transmission portion includes the ring gear, and wherein the nutrunner further includes a second transmission portion configured to transfer rotation from the spindle to the output drive.

In some aspects, the techniques described herein relate to a nutrunner including: a housing; a motor disposed within the housing and including an output shaft rotatable about an axis; a head extending from the housing, the head including an output drive; a transmission configured to transfer rotation from the output shaft to the output drive, the transmission including a ring gear that is rotatable about the axis with respect to the housing; and a clutch mechanism engaged with the ring gear; wherein the clutch mechanism is configured to prevent the ring gear from rotating relative to the housing when a torque applied to the ring gear is less than a torque threshold, wherein the clutch mechanism is configured to permit the ring gear to rotate relative to the housing when a torque applied to the ring gear is greater than or equal to the torque threshold, and wherein the torque threshold is adjustable by hand without use of a tool.

In some aspects, the techniques described herein relate to a nutrunner, wherein the clutch mechanism includes an adjustment collar configured to be rotated to adjust the torque threshold.

In some aspects, the techniques described herein relate to a nutrunner, wherein the adjustment collar includes an inner collar including a protrusion and an outer collar including a recess that receives the protrusion to couple the inner collar for co-rotation with the outer collar.

In some aspects, the techniques described herein relate to a nutrunner, wherein the clutch mechanism further includes a spring that abuts the inner collar such that movement of the inner collar along the axis compresses or decompresses the spring to adjust the torque threshold.

In some aspects, the techniques described herein relate to a nutrunner, further including a battery receptacle located at an end of the housing opposite the head, wherein the battery receptacle is configured to receive a battery pack in an insertion direction, and wherein the insertion direction is oriented at an oblique angle relative to the axis.

In some aspects, the techniques described herein relate to a nutrunner including: a housing; a motor disposed within the housing and including an output shaft; a head extending from the housing, the head including a rotatable output drive; a spindle disposed within the housing and extending between the output shaft of the motor and the head; and a transmission configured to transfer rotation from the output shaft to the output drive, the transmission including: a first transmission portion configured to transfer rotation from the output shaft to the spindle, the first transmission portion including a first planetary stage and a ring gear, a second transmission portion configured to transfer rotation from the spindle to the output drive, the second transmission portion including a second planetary stage, and a clutch mechanism disposed between the first transmission portion and the second transmission portion, wherein the clutch mechanism is configured to prevent the transfer of rotation from output shaft to the output drive when a torque applied to the ring gear is greater than or equal to a torque threshold.

In some aspects, the techniques described herein relate to a nutrunner, wherein the second transmission portion includes a first bevel gear that drives a second bevel gear coupled to the output drive such that the output shaft is driven about a first axis and the output drive is driven about a second axis different from the first axis.

In some aspects, the techniques described herein relate to a nutrunner, wherein the ring gear is rotatable within the housing, wherein the clutch mechanism is configured to prevent the ring gear from rotating relative to the housing when a torque applied to the ring gear is less than the torque threshold, and wherein the clutch mechanism is configured to permit the ring gear to rotate relative to the housing when a torque applied to the ring gear is greater than or equal to the torque threshold.

In some aspects, the techniques described herein relate to a nutrunner, wherein the clutch mechanism includes a collar that is rotatable by a user without a tool to adjust the torque threshold.

In some aspects, the techniques described herein relate to a nutrunner, further including a torque transducer coupled to the transmission; a controller in communication with the torque transducer; and a display in communication with the controller, wherein the controller is configured to determine a torque output of the output drive based on feedback from the torque transducer and to control the display to indicate the torque output.

In some aspects, the techniques described herein relate to a nutrunner, wherein the housing includes a gearcase, wherein the second transmission portion is supported within the gearcase, wherein the second transmission portion includes a ring gear, wherein the torque transducer includes a first portion coupled to the ring gear, a second portion coupled to the gearcase, and a thin web interconnecting the first portion and the second portion, wherein the thin web is configured to deform in response to reaction torque being transferred from the ring gear to the first portion of the torque transducer, and wherein the torque transducer further includes a strain gauge coupled to the thin web.

In some aspects, the techniques described herein relate to a nutrunner including: a housing including a handle portion, a first gearcase supported by the handle portion, a second gearcase coupled to the first gearcase, and a head coupled to the second gearcase, wherein the handle portion, the first gearcase, the second gearcase, and the head are arranged along a first axis; a motor supported by the handle portion of the housing and including an output shaft rotatable about the first axis; a battery receptacle disposed on the handle portion of the housing opposite the head, the battery receptacle configured to receive a battery to provide power to the motor; an output drive extending from the head and rotatable about a second axis; a transmission configured to transfer rotation from the output shaft to the output drive; a torque transducer coupled to the transmission; a controller in communication with the torque transducer; and a display in communication with the controller, wherein the controller is configured to determine a torque output of the output drive based on feedback from the torque transducer and to control the display to indicate the torque output.

In some aspects, the techniques described herein relate to a nutrunner, wherein the transmission includes a first transmission portion supported within the first gearcase and a second transmission portion supported within the second gearcase, and wherein the torque transducer is coupled to the second transmission portion.

In some aspects, the techniques described herein relate to a nutrunner, wherein the torque transducer includes a first portion coupled to the transmission, a second portion coupled to the second gearcase, and a thin web interconnecting the first portion and the second portion, wherein the thin web is configured to deform in response to reaction torque being transferred from the transmission to the first portion of the torque transducer, and wherein the torque transducer further includes a strain gauge coupled to the thin web.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

The present disclosure provides, in some aspects, a power tool, and more particularly a nutrunner tool, including a housing, a motor with an output shaft arranged along a first axis, a head including an output drive that is rotatable about a second axis perpendicular to the first axis, and a transmission configured to transfer torque and rotation from the output shaft to the output drive. The nutrunner also includes a clutch mechanism including an adjustment collar that is disposed around the housing. Rotation of the adjustment collar about the first axis adjusts a torque threshold at which the clutch mechanism slips to limit torque transfer to the output drive. This allows the nutrunner to apply torque to a fastener up to the torque threshold without over-tightening the fastener. The collar is advantageously adjustable by hand, without the use of tools, allowing the torque threshold to be quickly and conveniently adjusted by a user.

Figure 1:
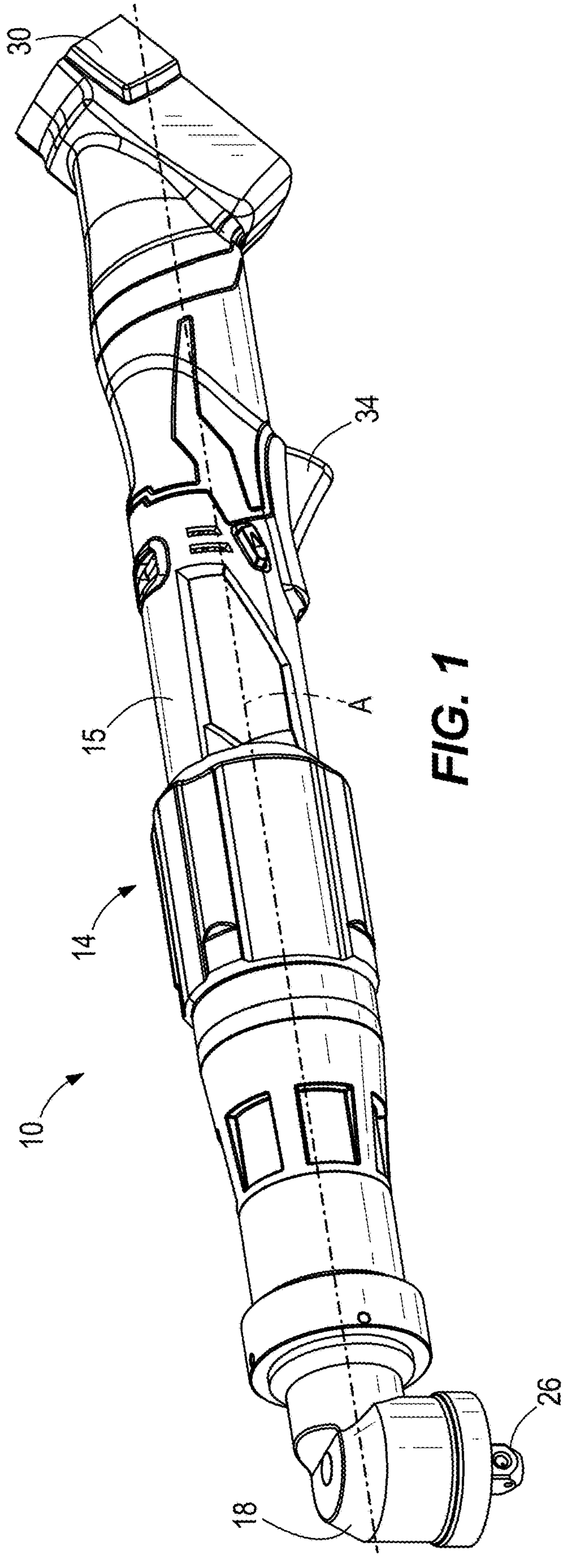
FIG. 1 is a perspective view of a nutrunner according to an embodiment of the present disclosure.
Figure 2:
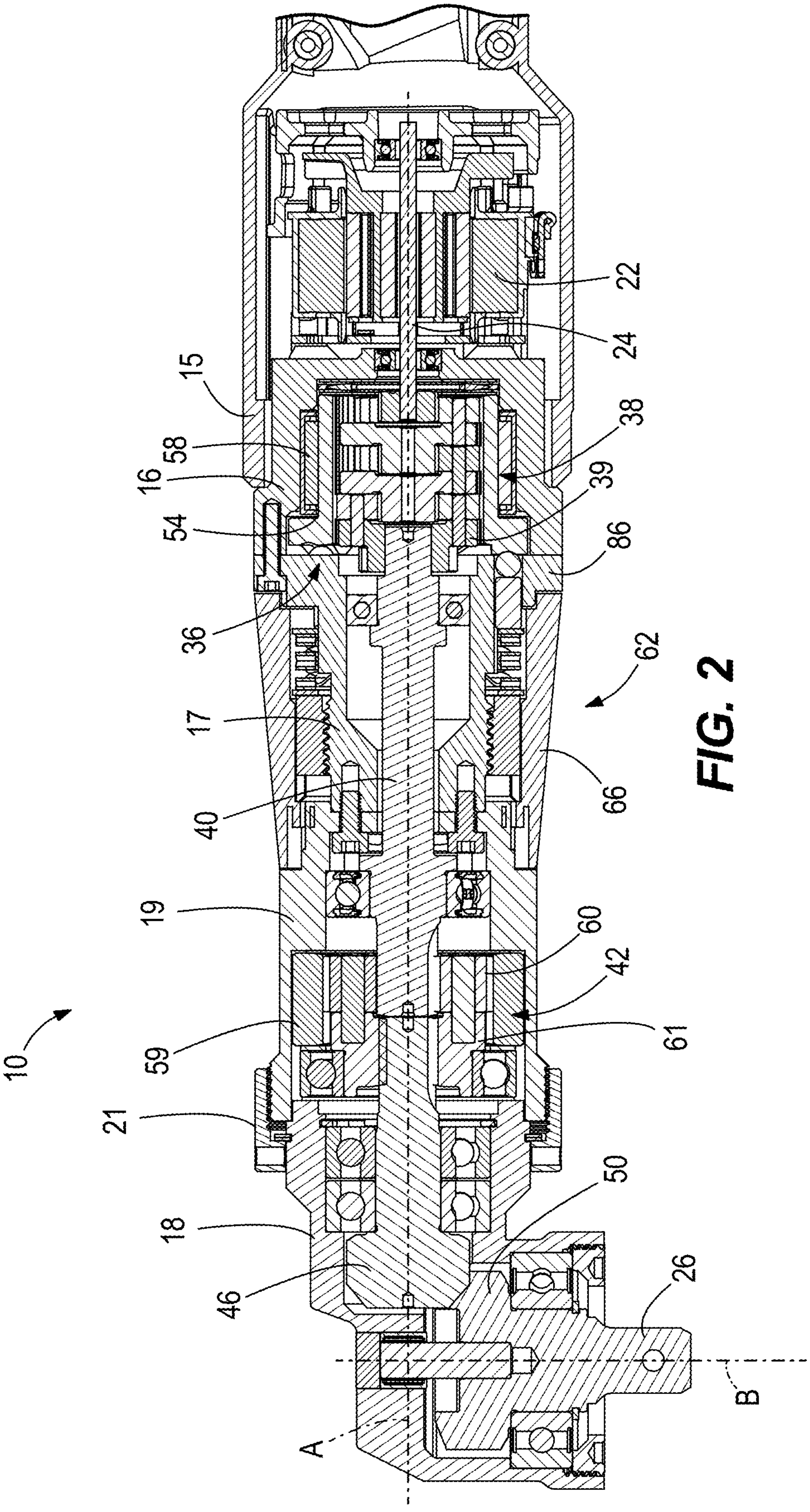
FIG. 2 is a schematic view of the nutrunner of FIG. 1.

For example, FIG. 1 illustrates an embodiment of a power tool in the form of a powered nutrunner 10. The nutrunner 10 includes a housing 14 having a handle portion 15 configured to be grasped by a user during operation of the nutrunner 10. Referring to FIG. 2, the housing 14 also includes a first gearcase comprising a rear gearcase portion 16 coupled to and partially received within the handle portion 15 and a front gearcase portion 17 coupled to and extending from an end of the rear gearcase portion 16 opposite the handle portion 15. The illustrated housing 14 further includes a second gearcase 19 coupled to and extending from an end of the front gearcase portion 17 opposite the rear gearcase portion 16, and a head 18 coupled to and extending from the second gearcase 19. The housing 14 of the nutrunner 10 thus defines an elongated in-line configuration, with the handle portion 15, first gearcase 16, 17, second gearcase 19, and head 18 connected to one another in series. In the illustrated embodiment, the head 18 is coupled to the second gearcase 19 by a threaded collar 21, which may be loosened or removed to permit adjustment (i.e., a change in orientation) or removal of the head 18 relative to the remainder of the housing 14.

With continued reference to FIG. 2, a motor 22 is supported within the handle portion 15 of the housing 14 and has an output shaft 24 rotatable about a first axis A (FIG. 2). The motor 22 is configured to provide torque to an output drive 26 rotatably supported by the head 18 for rotation about a second axis B perpendicular to the first axis A. The motor 22 is preferably a brushless DC motor. In some embodiments, the motor 22 may be a surface permanent magnet (SPM) motor including a stator, a rotor, and permanent magnets affixed to or embedded in an exterior surface of the rotor. In other embodiments, the motor 22 may be an outer rotor motor, having a rotor that surrounds and rotates about the stator.

The illustrated output drive 26 is configured to receive a tool bit (e.g., a socket), which may in turn cooperate with and perform work on a workpiece (e.g., a fastener). In some embodiments, the output drive 26 includes a square drive head, with a nominal size of ⅜-inch, ½-inch, ¾-inch, 1-inch, or any other desired size. In other embodiments, the output drive 26 may include a splined drive head, a hexagonal recess, or any other suitable geometry for receiving a tool bit.

In the illustrated embodiment, the nutrunner 10 includes a battery receptacle 30 formed in the housing 14, and more particularly at a rear end of the handle portion 15 opposite the head 18 (FIG. 1). The battery receptacle 30 is configured to receive a battery pack (e.g., a rechargeable power tool battery pack; not shown). The battery pack may have a nominal output voltage of 18-Volts in some embodiments. The battery receptacle 30 electrically connects the battery pack to the motor 22 via suitable electrical and electronic components, such as a PCBA (not shown) containing MOSFETs, IGBTs, or the like). In the illustrated embodiment, the battery receptacle 30 is oriented at an oblique angle with respect to the first axis A. That is, the battery pack is insertable and removable from the battery receptacle 30 in a direction that is obliquely oriented with respect to the first axis A.

In the illustrated embodiment, the nutrunner 10 includes an actuator 34 for controlling operation of the nutrunner 10 (e.g., to energize/de-energize the motor 22 via the PCBA). In the illustrated embodiment, the actuator 34 is a trigger that can be depressed into the housing 14 to energize the motor 22. The illustrated actuator 34 extends from the handle portion 15 of the housing 14 in the same direction as the output drive 26 and is positioned between the battery receptacle 30 and the head 18.

Referring to FIG. 2, the output drive 26 is operably coupled to the output shaft of the motor 22 via a gear assembly or transmission 36. The transmission 36 includes a first transmission portion 38 supported within the rear portion 16 of the first gearcase. The first transmission portion 38 operably couples the output shaft 24 of the motor 22 to a spindle 40. The illustrated transmission 36 also includes a second transmission portion 42 supported within the second gearcase 19. The second transmission portion 42 operably couples the spindle 40 to a first bevel gear 46. The first bevel gear 46 drives a second bevel gear 50 coupled to the output drive 26. Either or both the first transmission portion 38 and the second transmission portion 42 may be planetary transmissions. In the illustrated embodiment, the first transmission portion 38 is a three-stage planetary transmission including a last stage carrier 39 coupled for co-rotation with the spindle 40 (e.g., via a spline fit or other suitable torque-transferring connection). In other embodiments, the first transmission portion 38 may consist of a different number of stages. In the illustrated embodiment, the second transmission portion 42 is a single-stage planetary transmission. In other embodiments, the second transmission portion 42 may consist of a different number of stages or may be omitted in yet other embodiments. In some embodiments, other types of transmissions or gear reductions may be included as the first transmission portion 38 and/or second transmission portion 42

The first transmission portion 38 includes a ring gear 54 that is supported within the rear gearcase portion 16 of the first gearcase concentric with the first axis A. The illustrated ring gear 54 is common to all three stages of the first transmission portion 38. That is, three sets of planet gears may be meshed with the teeth of the ring gear 54 to rotate about the inner periphery of the ring gear 54. A radial bearing 58 (which may be a bushing, roller bearing, or the like) is positioned between the ring gear 54 and the housing 14 to rotatably support the ring gear 54 within the housing 14. In the illustrated embodiment, a thrust bearing 63 is positioned between a rear end of the ring gear 54 and the rear gearcase portion 16 to rotatably support the ring gear 54 against rearward axial forces.

With continued reference to FIG. 2, the second transmission portion 42 includes a ring gear 59 fixed within the second gearcase 19, a plurality of planet gears 60, and a carrier 61. The carrier 61 is coupled for co-rotation with a shaft portion of the first bevel gear 46 (e.g., via a spline fit or other suitable torque-transferring connection). The planet gears 60 are driven by the spindle 40 (e.g., the planet gears 60 are meshed with a pinion formed on the spindle 40) to advance around an inner periphery of the ring gear 59, thereby rotating the carrier 61 and the first bevel gear 46.

The illustrated nutrunner 10 includes a clutch mechanism 62 operably coupled between the output shaft 24 of the motor 22 and the output drive 26 to selectively limit torque transmission to the output drive 26 above a chosen torque threshold. In the illustrated embodiment, the clutch mechanism 62 is coupled between the first transmission portion 38 and the second transmission portion 42; however, in other embodiments, the clutch mechanism 62 may be coupled between the output shaft 24 and the first transmission portion 38 or between the output drive 26 and the second transmission portion 42. The clutch mechanism 62 allows a user to limit torque output of the nutrunner 10 to a desired torque setting. This aids the user in assembling delicate joint screws or screws with a specified torque rating, for example. In the illustrated embodiment, the clutch mechanism 62 includes an adjustment collar 66 to facilitate adjustment of the clutch mechanism 62 to different torque settings without the use of tools. The adjustment collar 66 extends between the rear gearcase portion 16 and the second gearcase 19 and surrounds at least a portion of the front gearcase portion 17.

Figure 3:
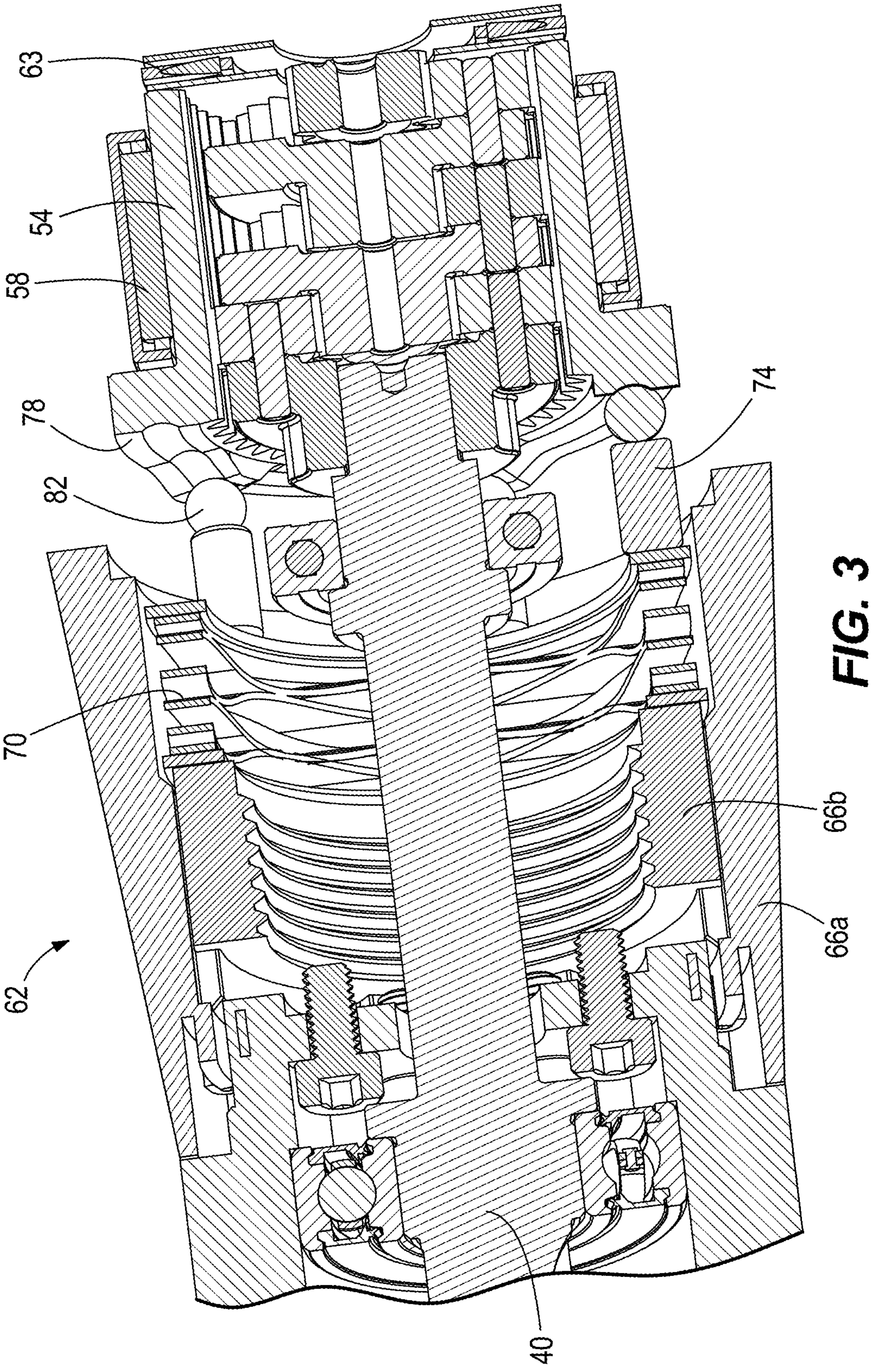
FIG. 3 is a perspective view of the nutrunner of FIG. 1 illustrating a clutch mechanism.

Referring to FIG. 3, the adjustment collar 66 of the clutch mechanism 62 includes an outer collar 66*a* and an inner collar 66*b*, which in the illustrated embodiment is configured as a nut. The clutch mechanism 62 further includes a biasing member or spring 70 that is disposed within a portion of the outer collar 66*a*. A first end of the spring 70 engages a surface of the inner collar 66*b* (either directly or through a washer positioned between the first end of the spring 70 and the inner collar 66*b*. In the illustrated embodiment, the spring 70 is a wave spring; however, the spring 70 may alternatively be a coil spring, spring washer, or any other biasing member.

A second end of the spring 70 engages a plurality of pins 74 (either directly or through a washer positioned between the second end of the spring 70 and the pins 74). The spring 70 biases the pins 74 toward an axial surface (i.e., a front surface) 78 of the ring gear 54. In the illustrated embodiment, the clutch mechanism 62 includes five pins 74. In other embodiments, the clutch mechanism 62 may include a different number of pins 74. In the illustrated embodiment, the pins 74 are distributed uniformly in a circumferential direction around the spindle 40. As described in greater detail below, the pins 74 engage corresponding rolling elements 82 (which are steel balls such as ball bearings in the illustrated embodiment), which in turn engage the front surface 78 of the ring gear 54.

Figure 4:
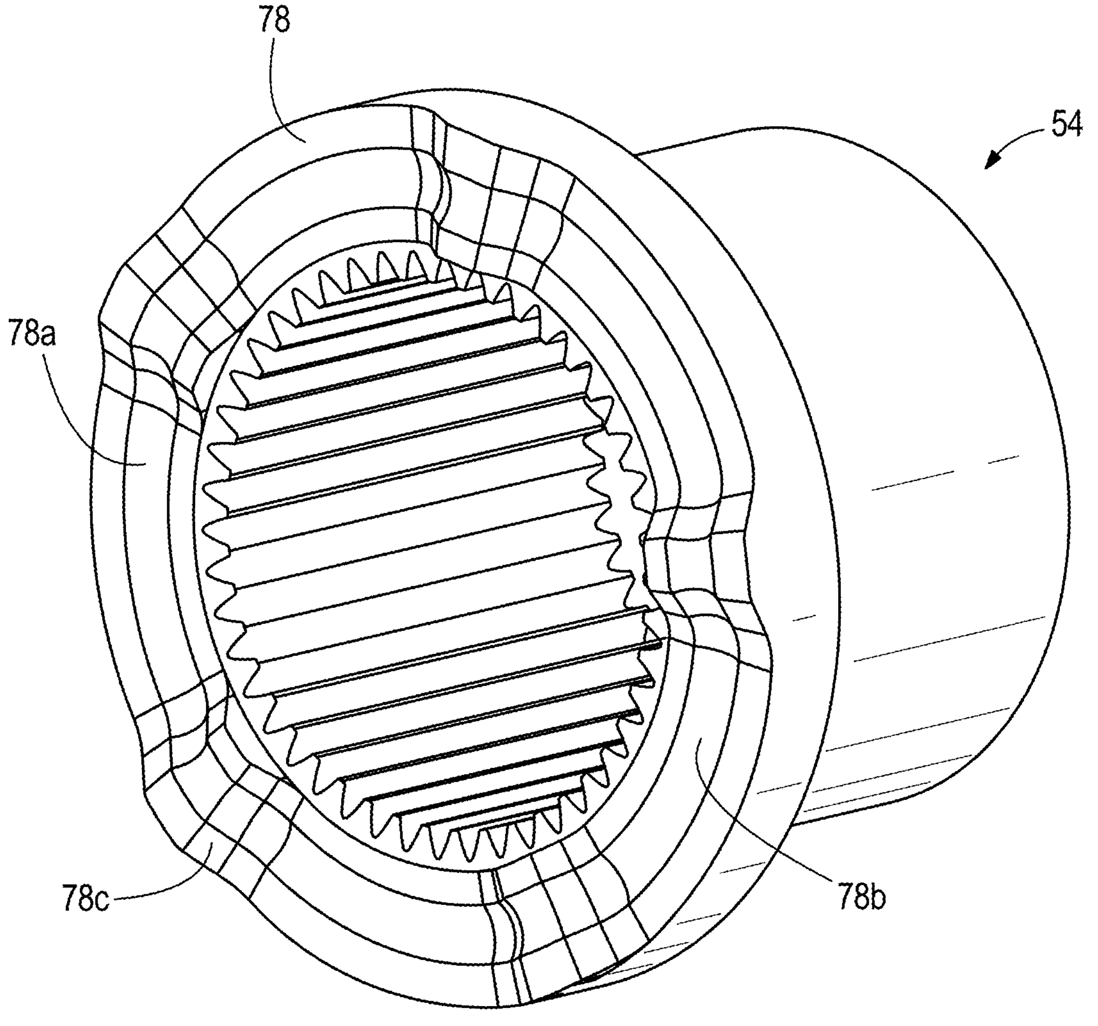
FIG. 4 is a perspective view of a ring gear of the clutch mechanism of FIG. 3.

Referring to FIG. 4, the front surface 78 of the ring gear 54 is disposed adjacent the teeth of the ring gear 54. An annular groove 78*a* is disposed in the front surface 78. The front surface 78 further includes alternating flat portions 78*b* and raised portions 78*c*. The raised portions 78*c* are closer to the adjustment collar 66 relative to the flat portions 78*b*. The number of raised portions 78*c* is equal to the number of pins 74 and rolling elements 82, and the raised portions 78*c* are spaced on the front surface 78 of the ring gear 54 in the same manner as the pins 74 are distributed around the spindle 40. In the illustrated embodiment, five raised portions 78*c* are distributed uniformly on the outer surface 78 of the ring gear 54.

Referring to FIGS. 3 and 4, the rolling elements 82 are received in the groove 78*a* of the front surface 78. Movement of the rolling elements 82 from the flat portions 78*b* of the outer surface 78 to raised portions 78*c* of the outer surface 78 displaces the pins 74 and thereby compresses the spring 70 due to differing distances between the inner collar 66*b* and the flat and raised portions 78*b*, 78*c*. Accordingly, for the rolling elements 82 to move over the raised portions 78*c* of the front surface 78, a biasing force of the spring 70 must be overcome. Therefore, during operation of the nutrunner 10, the ring gear 54 will remain rotationally fixed with respect to the housing 14 as long as the force between the front surface 78 and the rolling elements 82 does not exceed the biasing force of the spring 70. If the force between the front surface 78 and the rolling elements 82 due to torque on the ring gear 54 exceeds the biasing force of the spring 70, the ring gear 54 will rotate (i.e., slip) with respect to the housing 14, disabling the rotational output of the first transmission portion 38 and interrupting torque transfer to the output drive 26.

Figure 5A:
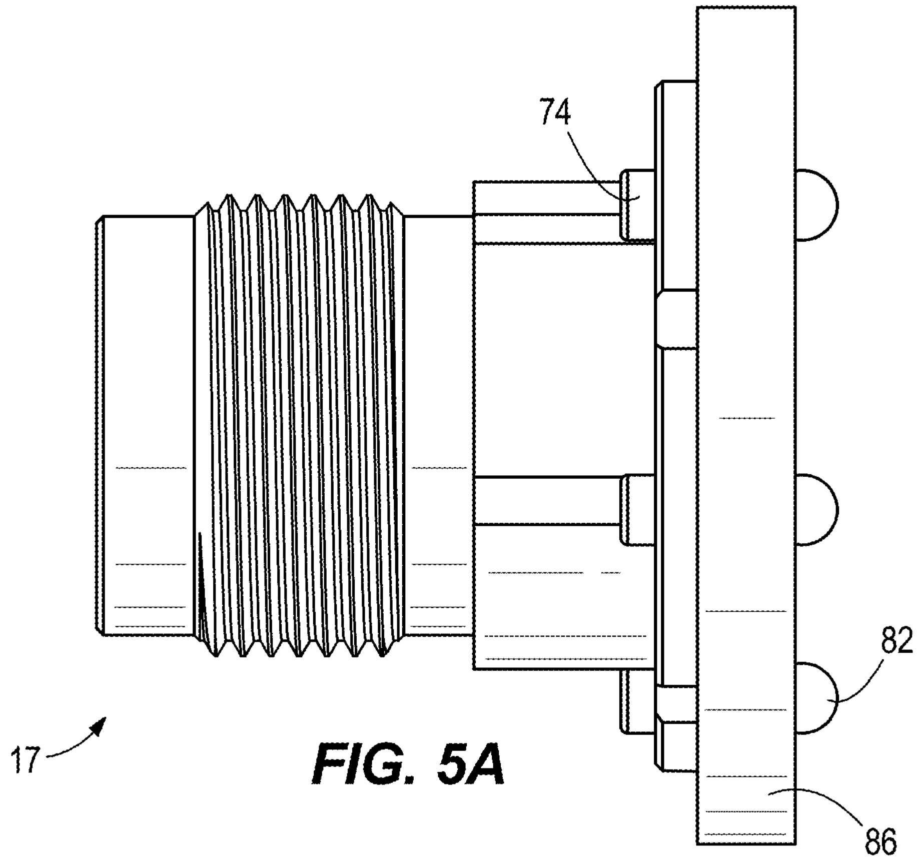
FIG. 5A is a first side view of a portion of a housing of the nutrunner of FIG. 1.
Figure 5B:
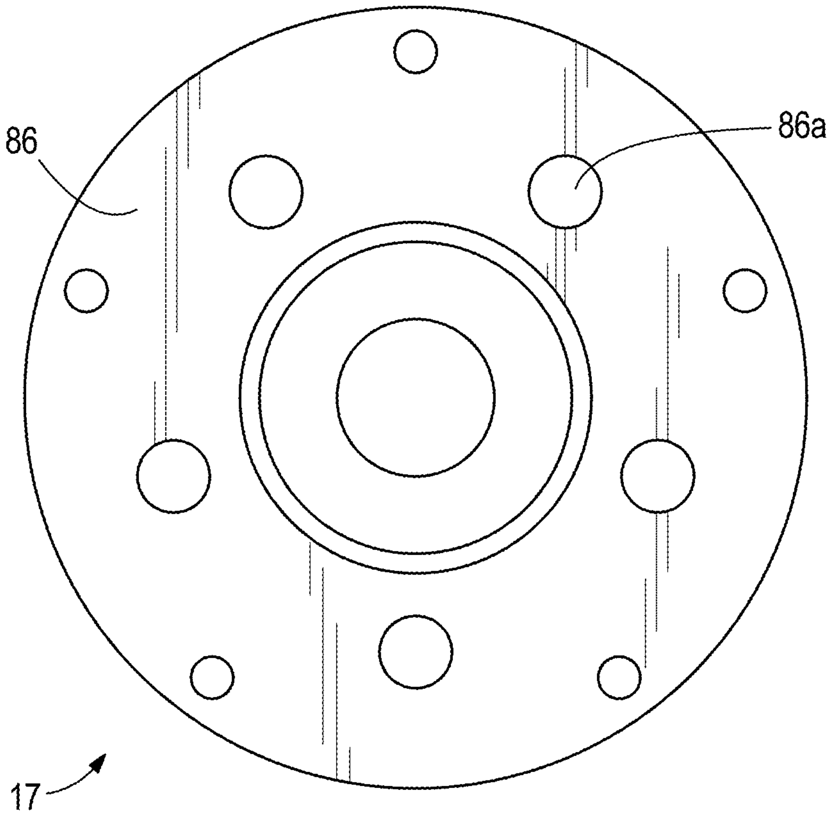
FIG. 5B is a second side view of a portion of the housing of the nutrunner of FIG. 1.

Referring to FIGS. 2, 5A, and 5B, the front gearcase portion 17 includes a flange portion 86. The flange portion 86 includes a plurality of apertures 86*a*. A portion of each of the plurality of pins 74 extends through each of the plurality of apertures 86*a*, and a portion of each of the plurality of rolling elements 82 is disposed within each of the plurality of apertures 86*a*. The plurality of pins 74 and the plurality of rolling elements 82 can move parallel to the first axis A within the plurality of apertures 86*a*. As such, the flange portion 86 of the front gearcase portion 17 acts as a guide for the plurality of pins 74 and the plurality of rolling elements 82 and keeps each of the plurality of rolling elements 82 engaged with one of the plurality of pins 74.

Figure 6:
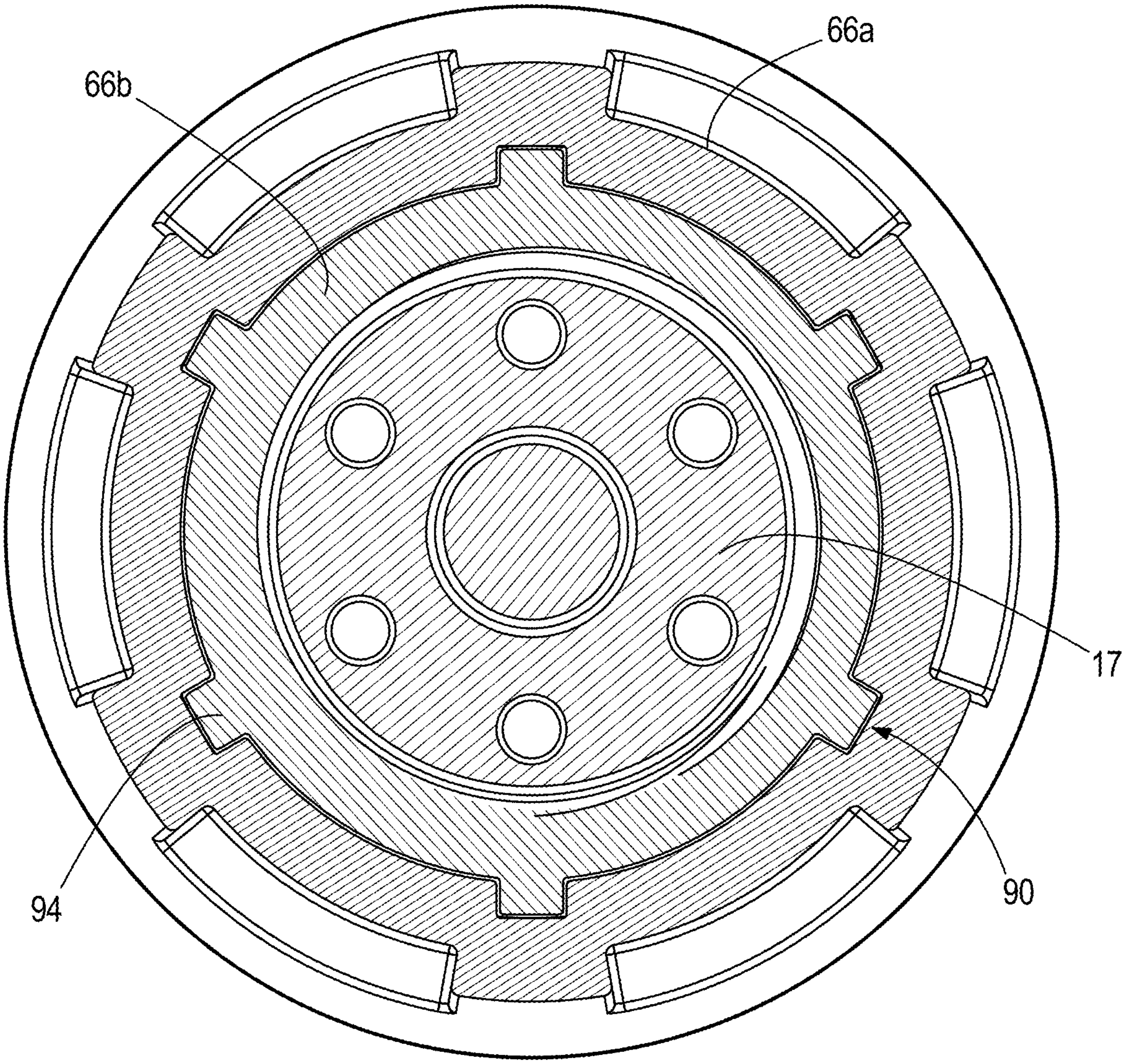
FIG. 6 is a side view of an adjustment collar of the clutch mechanism of FIG. 3.

Referring to FIG. 6, the outer collar 66*a* of the adjustment collar 66 includes a plurality of recesses 90. The inner collar 66*b* includes a plurality of protrusions 94 received within the plurality of recesses 90. As such, outer collar 66*a* and the inner collar 66*b* are rotationally fixed to one another. However, the inner collar 66*b* can slide along the first axis A with respect to the outer collar 66*a*.

Figure 7:
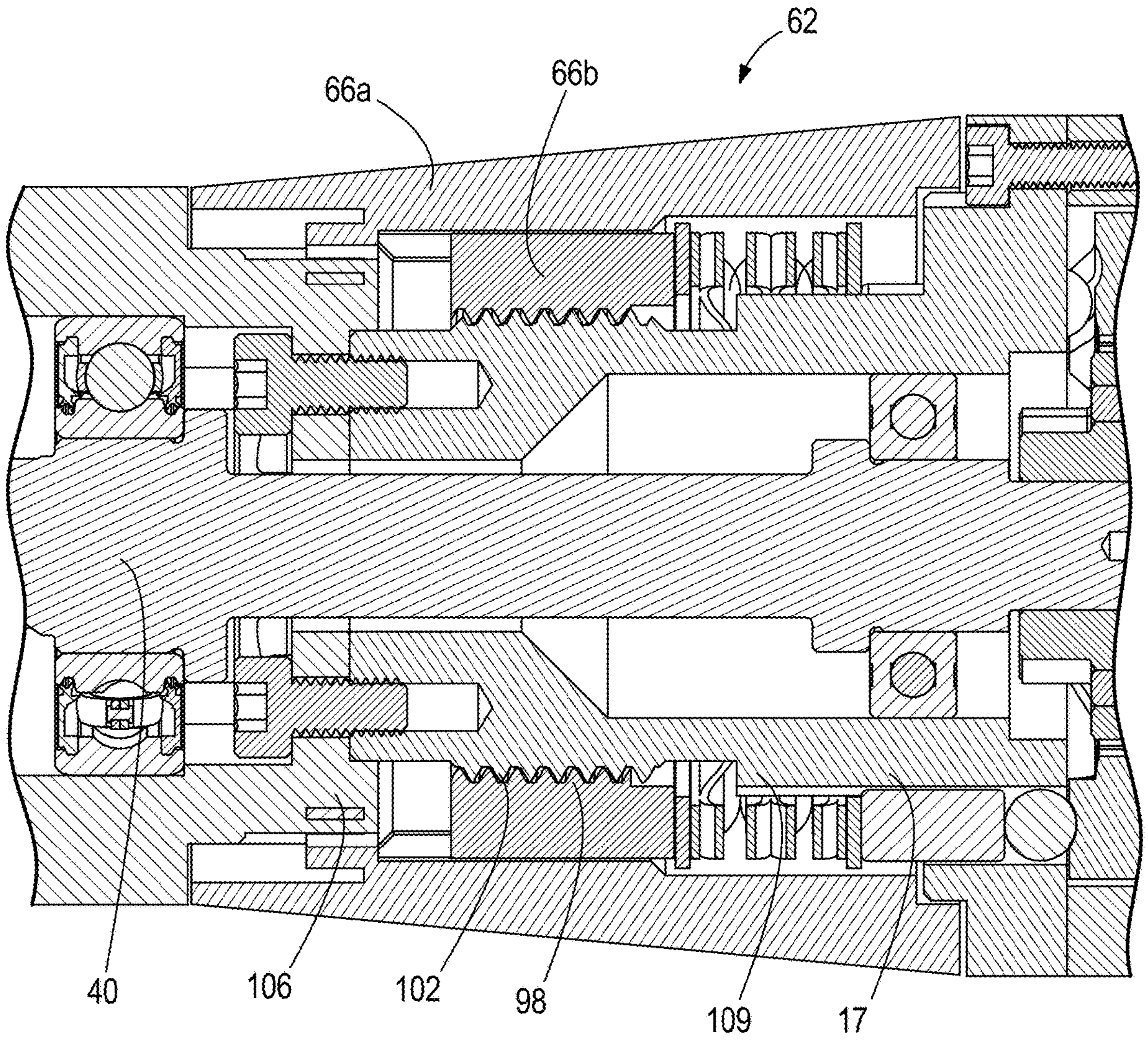
FIG. 7 is a side view of the clutch mechanism of FIG. 3.

Referring to FIG. 7, the inner collar 66*b* of the adjustment collar 66 includes an inner threaded portion 98. The inner threaded portion 98 of the inner collar 66*b* engages an outer threaded portion 102 of the front gearcase portion 17. Accordingly, rotation of the adjustment collar 66 about the housing 14 moves the inner collar 66*b* along the first axis A. The adjustment collar 66 can be freely rotated without use of a tool (i.e., a mechanical advantage mechanism). Movement of the inner collar 66*b* along the first axis A alters the distance between the inner collar 66*b* and the front surface 78 of the ring gear 54, and thereby alters the amount of compression (preload) of the spring 70. Therefore, actuating the adjustment collar 66 allows a user to adjust the force required for the ring gear 54 to slip (i.e., the torque setting). In the illustrated embodiment, the adjustment collar 66 can be completely rotated around the housing 14 between two and four times in moving from the lowest torque setting to the highest torque setting. Movement of the inner collar 66*b* along the first axis A is limited by a first step 106 and a second step 109. The first step 106 sets a lower torque setting limit, and the second step 109 sets an upper torque setting limit.

Figure 8A:
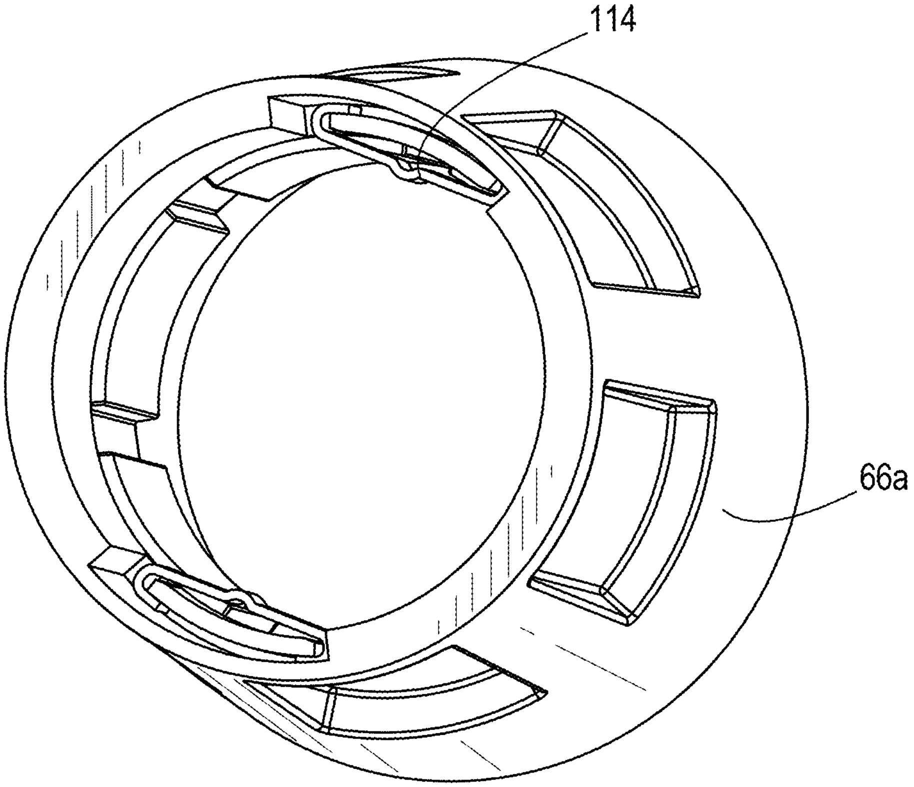
FIG. 8A is a perspective view of an outer collar of the adjustment collar of FIG. 6.
Figure 8B:
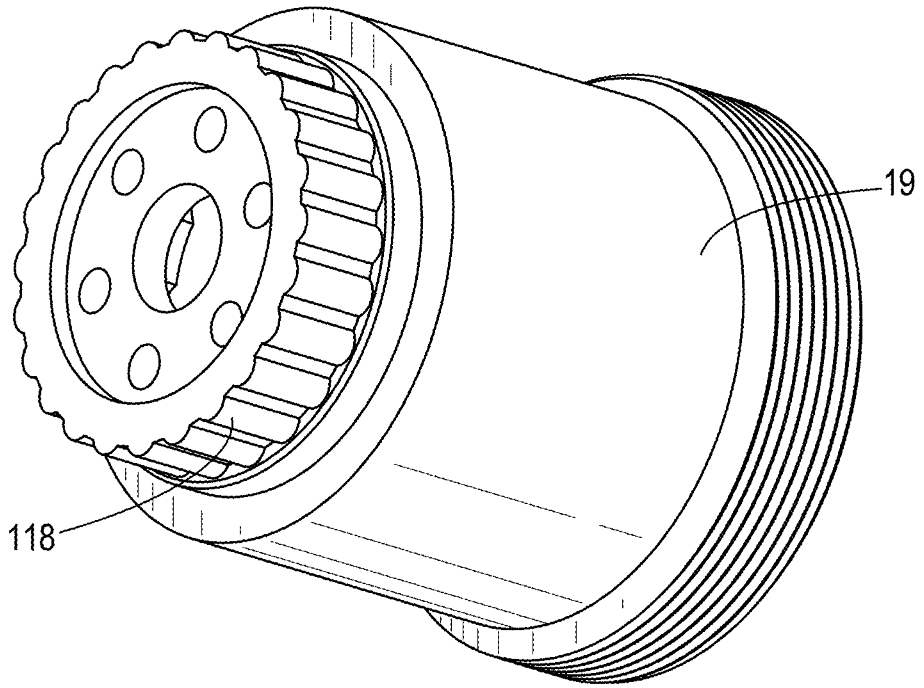
FIG. 8B is a perspective view of a portion of the housing of the nutrunner of FIG. 1.

Referring to FIGS. 8A and 8B, the outer collar 66*a* of the adjustment collar 66 includes at least one tab 114 on an inner surface of the outer collar 66*a*. In the illustrated embodiment, the outer collar 66*a* includes two tabs 114. In the illustrated embodiment, the tabs 114 are formed on leaf springs coupled to the outer collar 66*a*, such that the tabs 114 are resiliently supported and biased inwardly toward the housing 14. In other embodiments, the tabs 114 may be integrally formed with the outer collar 66*a* (e.g., as a living spring). The housing 14, and more specifically the second gearcase 19, includes a plurality of rounded projections or detents 118 configured to be engaged by the at least one tab 114. As such, a detent force between the at least one tab 114 and one of the plurality of detents 118 that is engaged by the at least one tab 114 must be overcome in order for the adjustment collar 66 to rotate with respect to the housing 14.

The detent force prevents unwanted rotation of the adjustment collar 66 due to vibration during operation of the nutrunner 10.

In operation, a user may operate the nutrunner 10 by grasping a handle portion of the housing 14 and depressing the actuator 34 to energize the motor 22. The motor 22 drives the motor output shaft 24, which provides a rotational input to the first transmission portion 38. The first transmission portion 38 drives the spindle 40, which provides a rotational input to the second transmission portion 42. The second transmission portion 42 drives the first bevel gear 46, which drives the second bevel gear 50 coupled to the output drive 26. Thus, the output drive 26 rotates (e.g., to drive a fastener). The first transmission portion 38 and the second transmission portion 42 each provide a speed reduction and torque increase from the motor output shaft 24 to the output drive 26. Thus, the output drive 26 is able to deliver a large amount of torque to the fastener. In some embodiments, the first bevel gear 46 and the second bevel gear 50 may be sized so as to provide a further speed reduction and torque increase.

The user may set a torque limit of the nutrunner 10 by rotating the adjustment collar 66 about the first axis A to a position corresponding with the desired torque value. If a threshold torque at the ring gear 54 corresponding with the desired torque value is reached or exceeded while operating the nutrunner 10, the clutch mechanism 62 will cause the ring gear 54 to slip, thereby disabling the rotational output of the first transmission portion 38 and interrupting torque transmission to the output drive 26.

Figure 9:
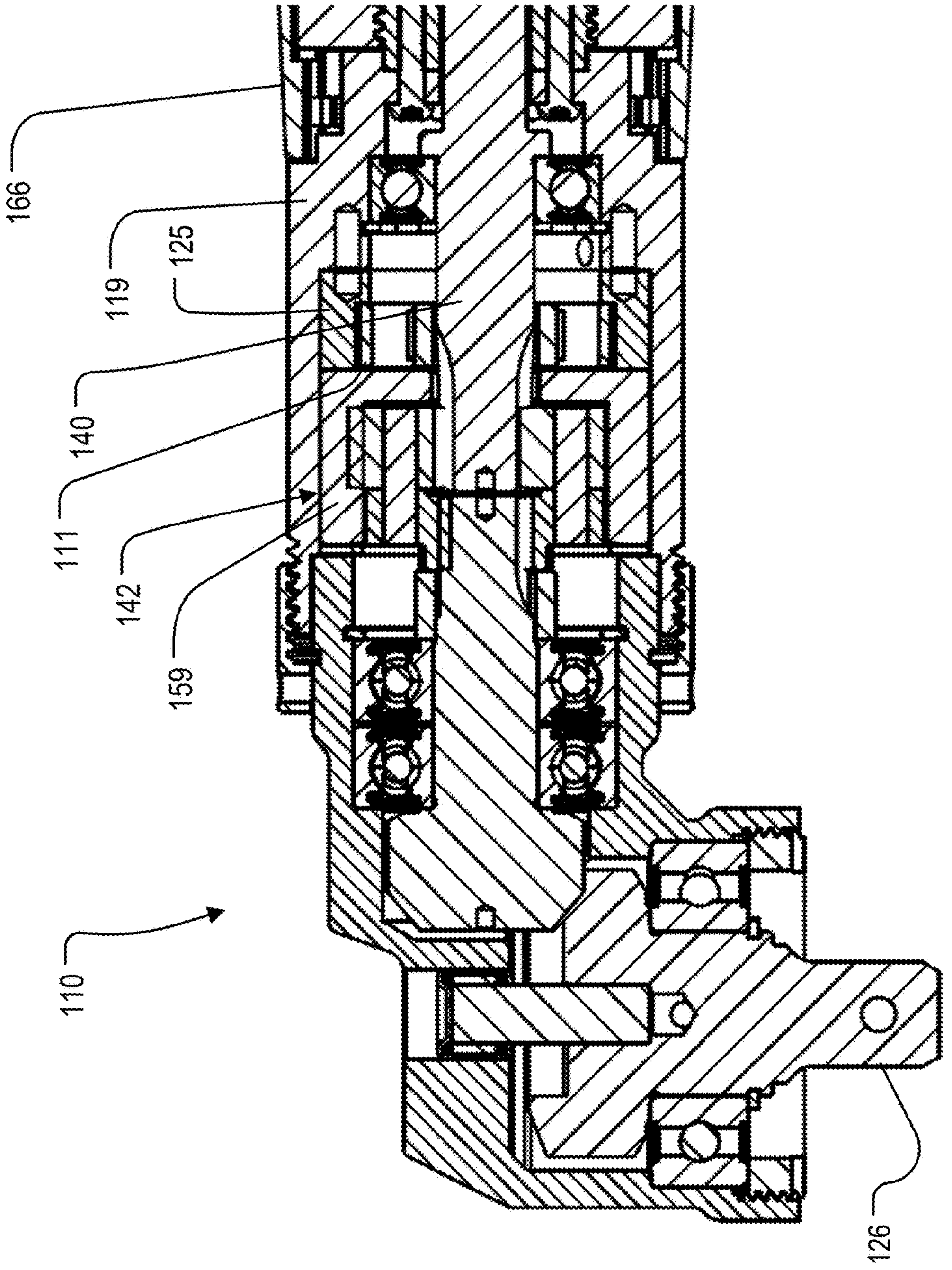
FIG. 9 is a cross-sectional view illustrating a portion of a nutrunner according to another embodiment of the present disclosure.
Figure 10:
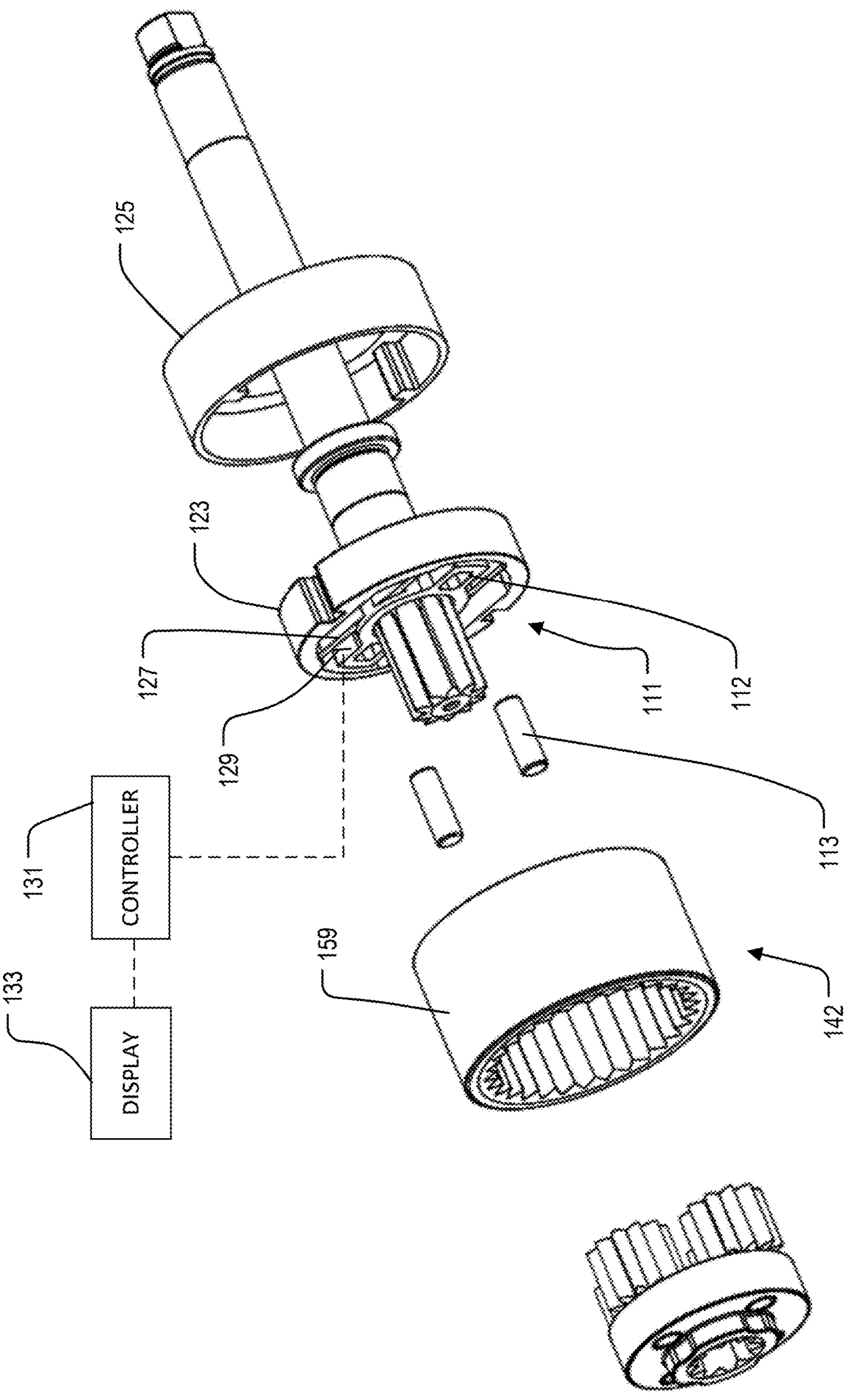
FIG. 10 is an exploded perspective view illustrating a torque transducer and a second transmission portion of the nutrunner of FIG. 9.

FIGS. 9-10 illustrates a nutrunner 110 according to another embodiment of the present disclosure. The nutrunner 110 is similar to the nutrunner 10 described above with reference to FIGS. 1-8B. As such, features of the nutrunner 110 corresponding with features of the nutrunner 10 are given like reference numerals plus '100.' In addition, the following description generally focuses on differences between the nutrunner 110 and the nutrunner 10. It should be understood that features of the nutrunner 10 may be incorporated into the nutrunner 110 where appropriate, and vice versa.

The illustrated nutrunner 110 includes a torque transducer 111 operable to measure at least one parameter from which a torque output of the nutrunner 110 may be determined. In the illustrated embodiment, the torque transducer 111 is supported within the second gearcase 119, adjacent a rear end of the ring gear 159 of the second transmission portion 142. As illustrated in FIG. 10, the ring gear 159 is coupled to a center portion 112 of the torque transducer 111 by pins 113. The torque transducer 111 has an outer ring 123 keyed to a support ring 125, which receives and surrounds the torque transducer 111. The support ring 125 is fixed within the second gearcase 119 (e.g., by a plurality of fasteners).

The illustrated torque transducer 111 includes a plurality of thin webs 127 interconnecting the center portion 112 of the torque transducer 111 with the outer ring 123. The webs 127 are deformable in response to torque (i.e., the reaction torque on the ring gear 159) being applied to the center portion 112 (via the pins 113) during operation of the nutrunner 110. The torque transducer 111 includes one or more strain gauges 129 disposed on the thin webs 127 to convert the deformation/strain of the webs 127 into electrical signals. These electrical signals are received by a controller 131 of the nutrunner 110, which may then use the feedback from the torque transducer 111 to determine a torque value applied by the nutrunner 110 during operation. The controller 131 may include, for example, a microprocessor, non-transitory memory, and an input-output interface in communication with the torque transducer 111.

In some embodiments, the nutrunner 110 includes a display 133 in communication with the controller 131 (e.g., via the input-output interface) and operable to indicate the torque value to the user. In some embodiments, the display 133 may include one or more LEDs configured to indicate when the measured torque value is within a predetermined range, which may be stored in the memory of the controller 131 and optionally programmed or selected by the user. In some embodiments, the display 133 may include an LCD screen or the like able to the measured torque value to the user as a numeric value.

The nutrunner 110 may include a clutch mechanism (e.g., the clutch mechanism 62 described above). In some embodiments, the clutch mechanism may be an electronic clutch mechanism controlled based on feedback from the torque transducer 111. In such embodiments, the collar 166 (FIG. 9) may be rotated to provide a clutch torque setting to the controller 131. During operation, the controller 131 monitors the feedback from the torque transducer 111 and stops torque transmission to the output drive 126 (e.g., by shutting down the motor) when the clutch torque setting is reached.

Although the disclosure has been described in detail with reference to certain preferred embodiments, variations and modifications exist within the scope and spirit of one or more independent aspects of the disclosure as described.

Various features and aspects of the present disclosure are set forth in the following claims.

What is claimed is:

1. A nutrunner comprising:
- a housing;
- a motor disposed within the housing and including an output shaft rotatable about a first axis;
- a head extending from the housing, the head including an output drive that is rotatable about a second axis;
- a transmission configured to transfer rotation from the output shaft to the output drive, the transmission including a ring gear that is rotatable about the first axis with respect to the housing; and
- a clutch mechanism including:
  - an adjustment collar that is disposed around the housing and rotatable about the first axis,
  - a plurality of rolling elements engaged with the ring gear, and
  - a spring positioned between the adjustment collar and the ring gear and configured to bias the plurality of rolling elements into engagement with the ring gear,
- wherein the clutch mechanism is configured to prevent the ring gear from rotating relative to the housing when a torque applied to the ring gear is less than a torque threshold, wherein the clutch mechanism is configured to permit the ring gear to rotate relative to the housing when a torque applied to the ring gear is greater than or equal to the torque threshold, and
- wherein rotation of the adjustment collar about the first axis adjusts the torque threshold,
- wherein the adjustment collar includes an outer collar and an inner collar, wherein the inner collar is rotationally fixed to the outer collar, and wherein the inner collar is moveable along the first axis with respect to the outer collar in response to rotation of the adjustment collar about the first axis.

2. The nutrunner of claim 1, wherein the adjustment collar is configured to be rotated by hand without use of a tool.

3. The nutrunner of claim 1, wherein the clutch mechanism further includes a plurality of pins disposed between the spring and the plurality of rolling elements.

4. The nutrunner of claim 3, wherein the ring gear includes a groove formed in a front surface of the ring gear, the groove extending in a circumferential direction along a plurality of flat portions and a plurality of raised portions, and wherein the plurality of rolling elements is received by the groove.

5. The nutrunner of claim 3, wherein the housing includes a flange portion having a plurality of apertures, and wherein the plurality of pins extends through the plurality of apertures in the flange portion.

6. The nutrunner of claim 1, wherein the housing includes a plurality of detents, the outer collar includes at least one tab configured to engage the detents.

7. The nutrunner of claim 1, wherein the housing includes an outer threaded portion, and the inner collar includes an inner threaded portion engaged with the outer threaded portion.

8. The nutrunner of claim 1, further comprising a spindle extending along the first axis, wherein the transmission includes a first transmission portion configured to transfer rotation from the output shaft to the spindle, wherein the first transmission portion includes the ring gear, and wherein the nutrunner further comprises a second transmission portion configured to transfer rotation from the spindle to the output drive.

9. A nutrunner comprising:

a housing;

a motor disposed within the housing and including an output shaft rotatable about an axis;

a head extending from the housing, the head including an output drive;

a transmission configured to transfer rotation from the output shaft to the output drive, the transmission including a ring gear that is rotatable about the axis with respect to the housing; and a clutch mechanism engaged with the ring gear;

wherein the clutch mechanism is configured to prevent the ring gear from rotating relative to the housing when a torque applied to the ring gear is less than a torque threshold, wherein the clutch mechanism is configured to permit the ring gear to rotate relative to the housing when a torque applied to the ring gear is greater than or equal to the torque threshold, and wherein the torque threshold is adjustable by hand without use of a tool wherein the clutch mechanism includes an adjustment collar configured to be rotated to adjust the torque threshold wherein the adjustment collar includes an inner collar including a protrusion and an outer collar including a recess that receives the protrusion to couple the inner collar for co-rotation with the outer collar.

10. The nutrunner of claim 9, wherein the clutch mechanism further includes a spring that abuts the inner collar such that movement of the inner collar along the axis compresses or decompresses the spring to adjust the torque threshold.

11. The nutrunner of claim 9, further comprising a battery receptacle located at an end of the housing opposite the head, wherein the battery receptacle is configured to receive a battery pack in an insertion direction, and wherein the insertion direction is oriented at an oblique angle relative to the axis.

12. A nutrunner comprising:

a housing;

a motor disposed within the housing and including an output shaft;

a head extending from the housing, the head including a rotatable output drive;

a spindle disposed within the housing and extending between the output shaft of the motor and the head; and a transmission configured to transfer rotation from the output shaft to the output drive, the transmission including:

a first transmission portion configured to transfer rotation from the output shaft to the spindle, the first transmission portion including a first planetary stage and a ring gear, a second transmission portion configured to transfer rotation from the spindle to the output drive, the second transmission portion including a second planetary stage, and a clutch mechanism disposed between the first transmission portion and the second transmission portion, wherein the clutch mechanism is configured to prevent the transfer of rotation from output shaft to the output drive when a torque applied to the ring gear is greater than or equal to a torque threshold.

13. The nutrunner of claim 12, wherein the second transmission portion includes a first bevel gear that drives a second bevel gear coupled to the output drive such that the output shaft is driven about a first axis and the output drive is driven about a second axis different from the first axis.

14. The nutrunner of claim 12, wherein the ring gear is rotatable within the housing, wherein the clutch mechanism is configured to prevent the ring gear from rotating relative to the housing when a torque applied to the ring gear is less than the torque threshold, and wherein the clutch mechanism is configured to permit the ring gear to rotate relative to the housing when a torque applied to the ring gear is greater than or equal to the torque threshold.

15. The nutrunner of claim 12, wherein the clutch mechanism includes a collar that is rotatable by a user without a tool to adjust the torque threshold.

16. The nutrunner of claim 12, further comprising a torque transducer coupled to the transmission; a controller in communication with the torque transducer; and a display in communication with the controller, wherein the controller is configured to determine a torque output of the output drive based on feedback from the torque transducer and to control the display to indicate the torque output.

17. The nutrunner of claim 16, wherein the housing includes a gearcase, wherein the second transmission portion is supported within the gearcase, wherein the second transmission portion includes a ring gear, wherein the torque transducer includes a first portion coupled to the ring gear, a second portion coupled to the gearcase, and a thin web interconnecting the first portion and the second portion, wherein the thin web is configured to deform in response to reaction torque being transferred from the ring gear to the first portion of the torque transducer, and wherein the torque transducer further includes a strain gauge coupled to the thin web.

* * * * *